May 9, 1933. H. HARDINGE 1,908,238
MEASURING FEEDING MECHANISM
Filed July 17, 1929 3 Sheets-Sheet 1
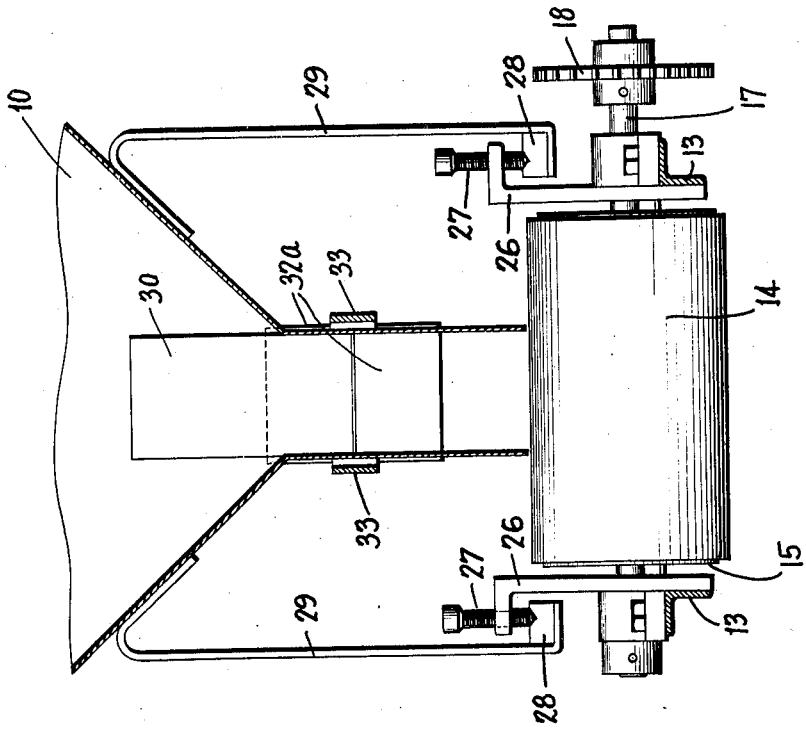
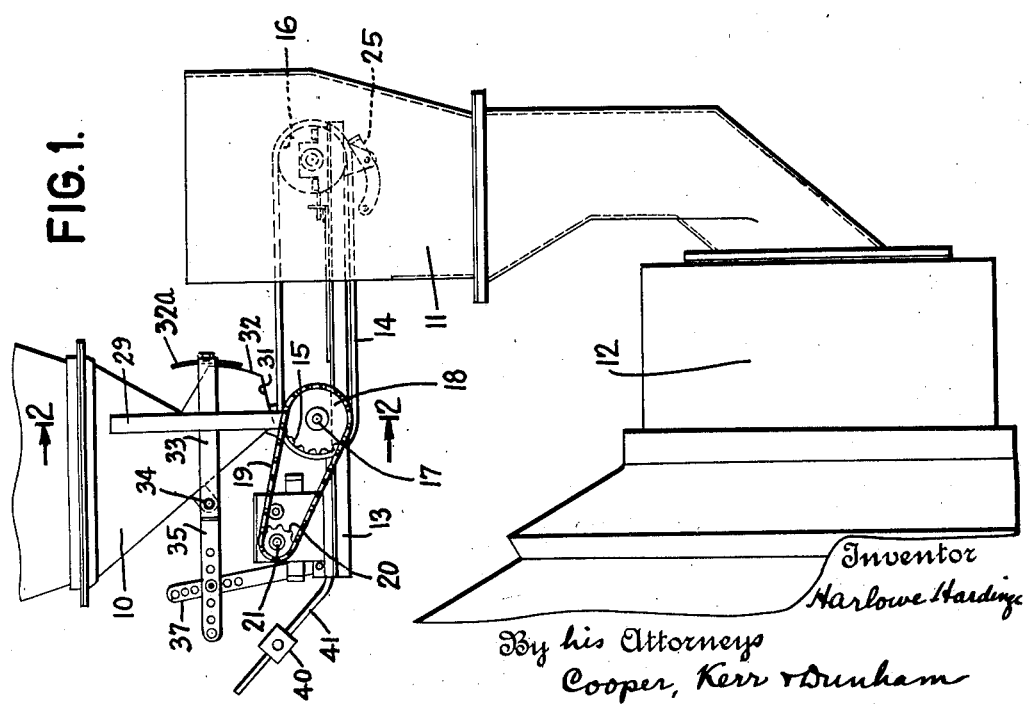
Inventor
Harlowe Hardinge
By his Attorneys
Cooper, Kerr & Dunham May 9, 1933.  H. HARDINGE  1,908,238
MEASURING FEEDING MECHANISM
Filed July 17, 1929  3 Sheets-Sheet 2

Inventor,
Harlowe Hardinge
By his Attorneys
Cooper, Kerr & Dunham

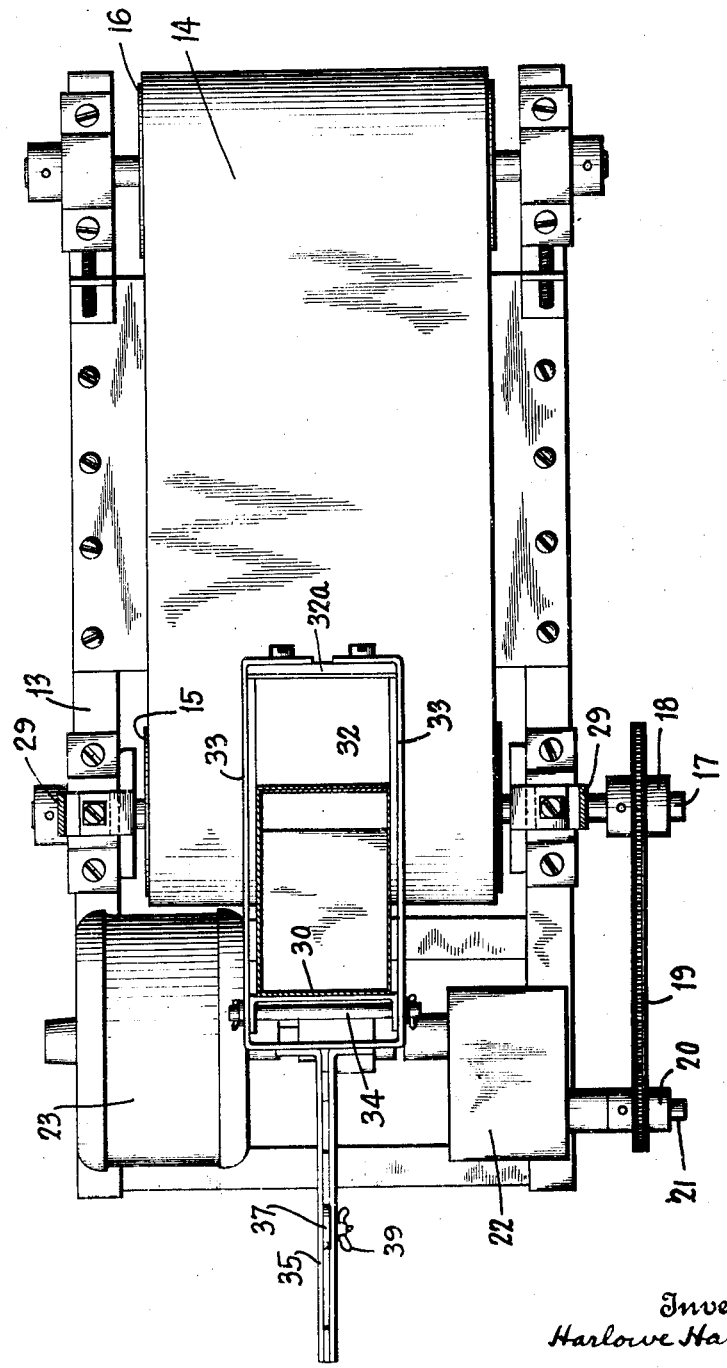

Patented May 9, 1933

1,908,238

UNITED STATES PATENT OFFICE

HARLOWE HARDINGE, OF YORK, PENNSYLVANIA, ASSIGNOR TO HARDINGE COMPANY, INCORPORATED, OF YORK, PENNSYLVANIA, A CORPORATION OF NEW YORK

MEASURING FEEDING MECHANISM

Application filed July 17, 1929. Serial No. 378,889.

This invention relates to an apparatus for delivering and regulating the discharge of material from a receptacle or supply hopper. Such devices have heretofore been provided which operate to control the volume of material being delivered but this manner of of control has not been found wholly satisfactory since the materials delivered frequently vary considerably in their actual weight with respect to volume owing to bin segregation which takes place between the coarse and fine material. In other cases, for example, with ores of certain grades and kinds, the specific gravity of the delivered material itself varies which makes volume control relatively inexact if constant weights are to be desired. Other apparatus has contemplated the control by weight but in these weight control devices the reaction of the driving motor has influences upon the accuracy of control.

The present invention is directed to the provision of an apparatus for feeding material from a receptacle and controlling the discharge to a given weight. The control is made irrespective of the size or volume of the material.

One object of the present invention resides in the provision of a simple apparatus which can be easily set by the operator to deliver a certain weight of material and which apparatus will thereafter maintain the delivery constant at that weight until a readjustment of the apparatus is made.

A further object of the present invention resides in the provision of a self regulating material discharging device which is readily adapted for setting for desired variations in discharge rates and in which the driving effects of the devices for the apparatus do not influence the control or setting.

A further object of the present invention resides in the provision of a tiltably supported conveyor structure in which the tilting of the conveyor structure as influenced by the load which is being conveyed is utilized for controlling the quantity of the material conveyed to either automatically increase the quantity or decrease it as conditions may require.

Further and other objects of the present invention will be hereinafter set forth in the accompanying specification and claims and shown in the drawings, which by way of illustration show what I now consider to be a preferred embodiment of the invention.

In the drawings:

Figure 1 is a side view showing the complete apparatus operatively associated with a supply hopper and a delivery hopper;

Fig. 2 is a detail cross-sectional view taken on line 2—2 of Fig. 1 and looking in the direction of the arrows;

Fig. 4 is a top plan view of the apparatus with certain parts shown in section, the section is taken substantially upon line 4—4 of Fig. 3.

Figure 3:
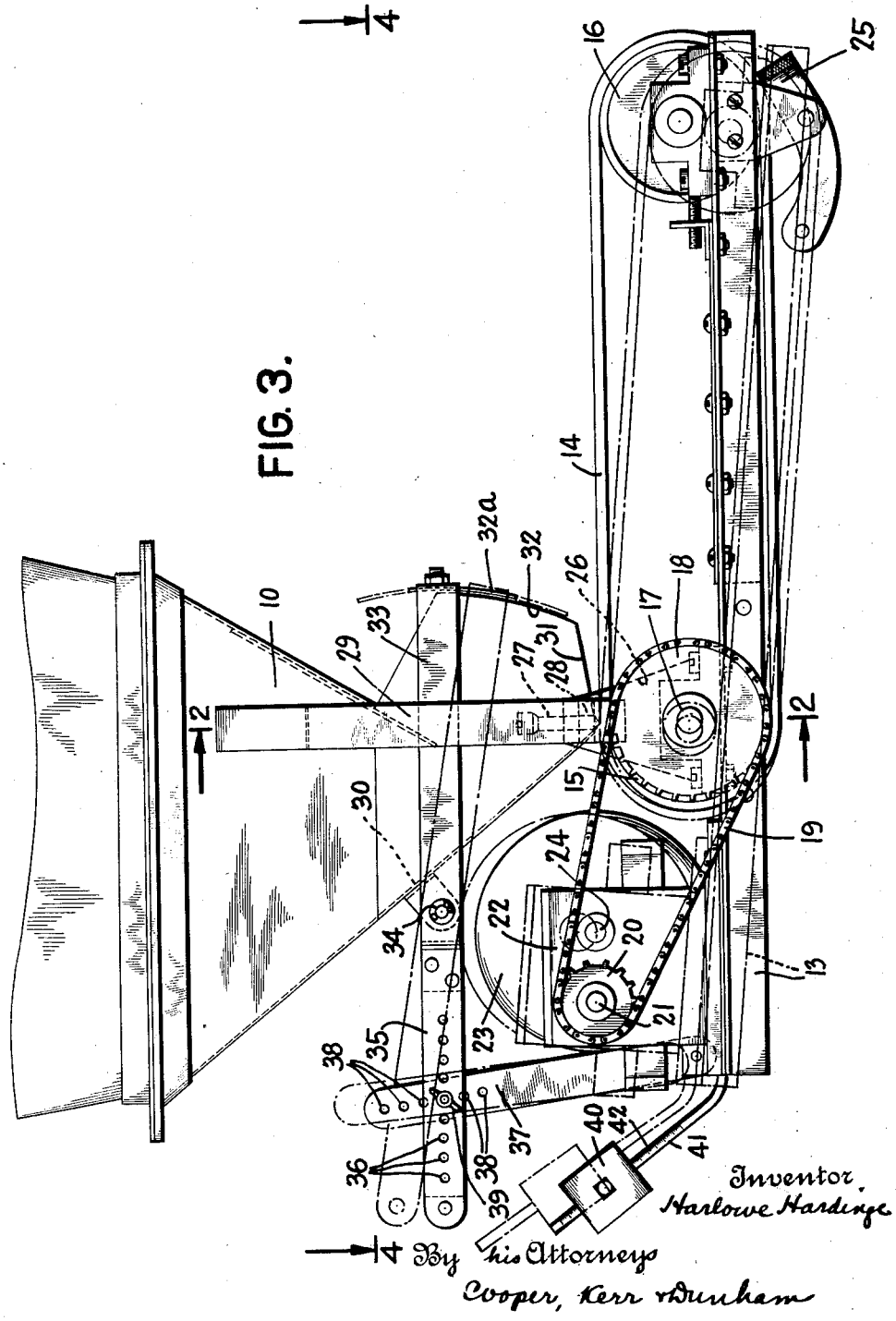
Fig. 3 is an enlarged detail side view with certain parts shown both in full lines and in dot and dash lines to show the parts in normal and displaced positions.

In more detail, 10 is the supply hopper or receptacle and 11 is a delivery hopper or receptacle which may, for example, be utilized to discharge the material to a grinding mill or similar apparatus generally designated 12 in Fig. 1.

My improved feeding means and weight measuring means which is disposed intermediate the supply hopper and delivery hopper will now be described.

13 is the supporting frame which may comprise a pair of angle members. Supported upon this frame is a traveling conveyor which is here shown as comprising a conveyor belt 14 which passes over a driving pulley 15 and a loose pulley 16. Both pulleys are suitably supported upon shafts which rotate in bearings supported by the frame.

While I have shown a belt type of continuous conveyor the invention is not limited to such specific forms of conveyor. In lieu of using a belt conveyor a disk type of conveyor could be employed. The shaft 17 which is fixed to the driving pulley has disposed upon its end a sprocket 18 adapted to be driven by a chain 19 from a sprocket 20. The shaft 21 carrying sprocket 20 extends into a speed reducing gear box generally designated 22. The gear train within this box extends to and is driven by an electric motor 23, the shaft 24 of which also extends into the gear box and drives the gear train therein. Within the gear box are reducing gears of any desired form which reduce the speed of drive from that of the relatively high speed motor shaft to the desired relatively lower sprocket speed. Both the gear box and the motor are supported upon the frame 13. To insure substantially complete removal of the conveyed material from the belt and its delivery into the receiving hopper, a scraper device 25 is provided, which scraper is also supported upon the frame 13. As shown in Fig. 1 the conveyor structure at its right extends into an open side of the delivery or receiving hopper.

All of the parts supported by the frame 13 are pivotally supported so that the complete continuous conveyor assembly may rock or tilt for a purpose to be hereinafter explained. For so pivotally supporting the frame and parts and other supports carried by it, the frame has secured to it a pair of brackets 26 (see Fig. 2) each of which carries a stud 27, pointed at its lower end and resting in a bearing block 28 which is fixedly mounted in any desired manner. As shown there are a pair of supporting bracket pieces 29 which support the bearing blocks 28. These bracket pieces in turn are secured to and supported by the supply hopper 10. Obviously the bearings 28 could be carried by any other desired fixed support.

The supply hopper 10 is preferably provided with a bottom 30 (see Fig. 3) which extends to a point adjacent to and slightly above the conveyor belt, and such hopper is also provided with a sloping open bottom 31 and with a delivery opening or port 32 at the right which is adapted to be varied in extent of opening by a gate 32a. The gate 32a is pivotally mounted upon a frame 33 which is pivotally supported upon the hopper at 34. The frame 33 beyond its pivot 34 is provided with an operating arm 35 in which there are a plurality of holes 36. The frame 13 is also provided with an upwardly extending link 37 which at its lower end is pivotally connected to the frame 13 and which adjacent its upper end is provided with a plurality of holes 38 so that a wing nut bolt 39 can be placed in any of the holes 38 and 36 to pivotally connect the link 37 with the arm 35.

Frame 13 at the left of its pivotal support is also provided with an adjustable counterweight or counterpoise 40 which is slidably supported upon a bar 41, which bar in turn is fixed to the frame 13. The bar 41 may be graduated if desired with graduations as indicated at 42 and a counterweight or counterpoise may be locked in any desired position upon the beam or bar 41 by a suitable locking means such as 43.

The operation of the device will now be described. When the motor is in operation material from the hopper is withdrawn therefrom by the moving conveyor and carried over and delivered to the discharge hopper. While delivery is effected, in the event that the quantity of material by weight which is traveling upon the belt increases, the complete conveyor assembly will tilt clockwise and cause the gate 32a to be swung towards the shut off position. When the conveyed material decreases in weight the reverse action takes place and the gate 32a is displaced towards a more open position. Preferably the leverages and relations of parts are such that the gate drops at a greater rate than the conveyor assembly is lowered or tilted due to increase in weight. By changing the position of the wing nut 39 in the holes 36 in arm 35, the leverage ratio between the gate 32a and the tilting conveyor assembly may be varied.

Adjustments of the quantity of feed can be made by changing the height of the gate through the link mechanism at holes 38. By placing the wing nut 39 in desired holes 38 the intitial position of the gate 32a can be changed. Other adjustments can be made between 39 and 36 to meet the operating conditions desired. Also the speed of the conveyor belt may be changed either by changing the ratio of the gears in the speed reducing gear box 22 or the sprocket diameters may be changed.

A further adjustment can be made by moving the counterbalance weight 40 backward or forward on bar 41. A movement to the left tends to raise the conveyor assembly and thus reduce the initial opening and a movement to the right tends to increase such initial opening. Also the speed of the motor itself can be changed which, of course, changes the belt speed.

Material advantages are secured by mounting the motor and driving devices upon the pivotally supported frame over a construction in which the motor or driving devices are disposed upon a fixed support. With such a construction with the motor or driving devices upon a fixed support the driving force of the motor itself tends to set up a turning moment which disturbs the balance of the device and makes it particularly difficult to adjust for proper action. Control is particularly difficult with such constructions where there is a variation in the pressure of the feed against the gate.

According to the present invention variations in the driving forces or reactions are immaterial on account of the mounting of the motor upon the frame which carries the conveyor and by reason of the provision of a common pivotal support for the entire assembly these driving reactions do not in any way tend to impart turning moments to the conveyor assembly which would influence the action of the gate.

Preferably the relations and dispositions of the weighty parts of the tiltable conveyor assembly are such that the point of suspension of the structure is slightly above the center of gravity of the structure including the driving mechanism belt, etc. This makes the structure somewhat more suitable and obviates overbalancing tendencies.

As shown in Figs. 2 and 3 the pivot studs 27 are adjustable with respect to the brackets 26. When the device is in operation the retardational drag or resistance of the applied material with respect to the belt would tend to tip the conveyor under certain conditions of load if provision were not made for compensating the retardational force transmitted through the material. The effect of a moment caused by this force can be compensated by varying the relation of the pivot points 27 with respect to the belt. The pivots may be positioned substantially in line with the belt or they may be placed in any position between the surface of the belt and the bottom of the gate. By properly relating the parts the effect of any moment caused by retardational forces transmitted to the conveyor through the material may be eliminated for different quantities of material being weighed.

It will be understood that the device may be set for a given weight of material and with a constant speed of motor operation there will be a constant weight of delivery until the motor speed is changed or until a different setting of the parts is made. Variation in weights and delivery can be made in the manner heretofore explained.

What I claim is:

1. An apparatus for regulating the discharge of material from a receptacle, including a gate for controlling the discharge opening therefrom and comprising in combination a continuous conveyor device including a power driving means therefor which is mounted upon a common structure which also affords a support for the conveyor, a common pivotal support for the conveying and driving means, said common pivotal support, said common structure and the mounting of the power drive thereon cooperating to prevent driving reactions from the drive affecting the tilting of the conveyor, and means for utilizing the tilting effect of the conveyor which is brought about by a change in the weight of the material being conveyed for changing the position of the gate.

2. An apparatus for conveying material and regulating the discharge to automatically maintain a constant weight of delivery of such material, comprising a traveling conveyor, a hopper opening onto said conveyor and containing material, means for controlling the flow of material from said hopper to said conveyor, said conveyor being tiltably supported and adapted to tilt in one direction when conveyed loads thereon increase in weight and to tilt in the opposite direction when conveyed loads thereon decrease in weight, means for driving said conveyor without affecting the pivotal balance of the conveyor, and interconnecting means for utilizing the aforesaid tilting action to control the position of said flow controlling means for the purpose described.

3. An apparatus for conveying material and regulating its discharge by weight, comprising a supply receptacle, a delivery receptacle, a continuously movable conveyor therebetween, driving means for said conveyor, means pivotally supporting said conveyor, the line of pivot of said last named means being in a horizontal plane above the center of gravity of the pivotal structure and intermediate its ends, a gate to control the amount of material withdrawn from the supply receptacle by the conveyor, means for tiltably supporting the entire conveyor, and connections from the conveyor supporting structure for moving the gate towards closed position when the load of material upon the conveyor increases and tilts it in one direction and for also moving the gate towards a more open position when the load of material upon the conveyor decreases and permits tilting of the conveyor in the opposite direction.

4. A conveyor device for discharging material and regulating its discharge by weight, said device comprising a tiltably mounted conveyor carried by a frame adapted to tilt as a unit about a pivotal support and an adjustable counterpoise carried by said frame and adapted for in and out displacement relative to the point of pivotal support of said conveyor for regulating its tilting action.

5. A continuous weighing device comprising, in combination, a traveling conveyor comprising a belt, driving means for said conveyor, support means on which is mounted the conveyor and driving means, said support means being pivotally mounted intermediate its ends on stationary support means, a supply hopper adjacent said conveyor, and discharging material upon the receiving end of said conveyor, the greater portion of said conveyor being out from under said opening, a regulating gate for regulating the supply of material to the conveyor from said hopper, and means associated with the conveyor support means and regulating gate for controlling the degree of opening of the gate in accordance with the position of tilt of the conveyor support means.

6. A continuous weighing device comprising, in combination, a conveyor, driving means comprising a source of power, support means on which is mounted the conveyor and said driving means, said support means being pivotally mounted on a stationary support, a hopper adjacent one end of said conveyor, and a gate for controlling the supply of material from said hopper to said conveyor.

7. A continuous weighing device comprising, in combination, a conveyor, driving means for said conveyor, support means on which is mounted said conveyor, means for supplying material to said conveyor, and means pivotally mounting said support means in a balanced condition when receiving material from said material supplying means, whereby all torque interactions between the driving means and the conveyor is confined to the support means so as not to influence the angle of tilt of the support means.

8. A continuous weighing device comprising, in combination, a conveyor comprising a traveling belt, actuating means for said conveyor, a frame supporting said actuating means and conveyor, said frame being pivotally supported with its ends overhanging the line of pivotal support, a supply hopper having an opening directly discharging material over a lesser surface of said belt, a gate for controlling the supply of material from said hopper to said conveyor, and means comprising linkage interconnecting said gate and frame whereby movement of the frame will cause movement of the regulating of the gate.

9. A continuous weighing device comprising, in combination, a conveyor comprising a traveling belt, actuating means therefor, a pivoted frame carrying said conveyor and actuating means, said frame being pivoted intermediate its ends and said conveyor being disposed to carry material from the vicinity of the line of pivotal support of said frame to one end thereof, a material supply hopper above the line of pivotal support of said frame, counterbalancing means at the other end of said frame, and means automatically controlling the quantity of material deposited upon and carried by said conveyor in accordance with the angle of tilt of said frame.

10. The combination set forth in claim 9 in which said counterbalancing means comprises a weight whose position may be varied with respect to the line of pivotal support about which the frame tilts.

11. A continuous weighing device comprising, in combination, a conveyor, means for driving said conveyor comprising an electric motor, a frame pivotally mounted intermediate its ends and supporting said conveyor, said conveyor comprising a belt moving from the point of pivot of said frame toward one end, a material supply hopper for supplying material to said belt, the opening of said hopper overlying but a lesser length of the surface of said belt, and weighted means disposed upon said frame on the side of its point of pivot opposite to the side upon which said belt is mounted, and means controlling the quantity of material deposited on said belt from said supply hopper.

12. The combination set forth in claim 11 in which said driving means comprises an electric motor mounted upon the pivotally mounted frame.

13. A continuous weighing device comprising, in combination, a material containing receptacle, a gate for controlling the quantity of material leaving said receptacle, a conveyor and driving mechanism therefor, a pivotally mounted structure supporting said conveyor and driving mechanism therefor, and means pivotally supporting said structure in the vicinity of the material receiving end of the conveyor and substantially in line with the retardational forces transmitted to the conveyor through the material being deposited thereon from said supply receptacle, whereby the effect of said retardational force for tilting the frame is eliminated.

14. The combination set forth in claim 13 in which the supply receptacle is located above the line of pivotal support of the frame and the conveyor serves as the bottom of said supply receptacle.

15. The combination set forth in claim 13 in which the means for pivotally supporting the frame is adjustable for varying the line of pivotal support with respect to the surface of the conveyor.

16. A continuous weighing device comprising, in combination, a supply receptacle with a discharge opening, an adjustable gate for varying said discharge opening, a conveyor whose surface serves as the bottom of said supply receptacle, driving means for said conveyor, a pivoted frame upon which said conveyor is mounted, said frame having physical contact only with its pivots, said adjustable gate and the material being deposited upon the conveyor, weighted means contributing to the balance of said frame, and connections intermediate said frame and gate whereby an overweight of material on the conveyor will alter the gate position and reduce the receptacle discharge opening and an underweight of material on the conveyor will alter the gate position and increase the receptacle discharge opening, said movements of said gate being dependent upon the position of tilt of said conveyor frame.

In testimony whereof I hereto affix my signature.

HARLOWE HARDINGE.